United States Patent
Goshima et al.

(10) Patent No.: US 11,236,229 B2
(45) Date of Patent: Feb. 1, 2022

(54) PRODUCTION METHOD OF THERMOPLASTIC AROMATIC POLYESTER RESIN COMPOSITION

(71) Applicant: POLYPLASTICS CO., LTD., Tokyo (JP)

(72) Inventors: Kazuya Goshima, Fuji (JP); Keiichi Osano, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

(21) Appl. No.: 16/483,977

(22) PCT Filed: Feb. 6, 2018

(86) PCT No.: PCT/JP2018/004091
§ 371 (c)(1),
(2) Date: Aug. 6, 2019

(87) PCT Pub. No.: WO2018/143479
PCT Pub. Date: Aug. 9, 2018

(65) Prior Publication Data
US 2020/0010668 A1  Jan. 9, 2020

(30) Foreign Application Priority Data
Feb. 6, 2017 (JP) .............................. JP2017-019478

(51) Int. Cl.
*C08L 67/02* (2006.01)
*C08G 63/183* (2006.01)
*C08K 3/26* (2006.01)
*C08K 5/098* (2006.01)
*C08K 5/29* (2006.01)

(52) U.S. Cl.
CPC ............ *C08L 67/02* (2013.01); *C08G 63/183* (2013.01); *C08K 3/26* (2013.01); *C08K 5/098* (2013.01); *C08K 5/29* (2013.01); *C08G 2120/00* (2013.01); *C08K 2003/265* (2013.01); *C08L 2203/20* (2013.01)

(58) Field of Classification Search
None
See application file for complete search history.

(56) References Cited

U.S. PATENT DOCUMENTS

| | | | |
|---|---|---|---|
| 2011/0092616 | A1 | 4/2011 | Sakata et al. |
| 2011/0114172 | A1 | 5/2011 | Nakada et al. |

FOREIGN PATENT DOCUMENTS

| | | |
|---|---|---|
| CN | 102056988 A | 5/2011 |
| EP | 3 327 085 A1 | 5/2018 |
| JP | 2003-160718 A | 6/2003 |
| JP | 2004-75756 A | 3/2004 |
| JP | 2010-229289 A | 10/2010 |
| JP | 2017-119855 A | 7/2017 |
| WO | 2010/018662 A1 | 2/2010 |
| WO | 2016/133056 A1 | 8/2016 |
| WO | 2017/014239 A1 | 1/2017 |

OTHER PUBLICATIONS

International Search Report dated May 15, 2018, issued in counterpart International Application No. PCT/JP2018/004091 (2 pages).

*Primary Examiner* — Ana L. Woodward
(74) *Attorney, Agent, or Firm* — Westerman, Hattori, Daniels & Adrian, LLP

(57) ABSTRACT

A manufacturing method for a thermoplastic aromatic polyester resin composition is disclosed having a step of blending: a thermoplastic aromatic polyester resin A; an alkali composition B containing a thermoplastic aromatic polyester resin a and an alkali compound b; and a carbodiimide compound C. The alkali composition B is preferably a composition in which an aqueous solution of the alkali compound b is melt-kneaded with the thermoplastic aromatic polyester resin a. The carbodiimide compound C preferably contains an aromatic carbodiimide compound. The alkali compound U content in the thermoplastic aromatic polyester resin composition is preferably 10 ppm by mass or more and 100 ppm by mass or less.

10 Claims, No Drawings

US 11,236,229 B2

PRODUCTION METHOD OF THERMOPLASTIC AROMATIC POLYESTER RESIN COMPOSITION

TECHNICAL FIELD

The present invention pertains to a manufacturing method for a thermoplastic aromatic polyester resin composition.

BACKGROUND ART

Thermoplastic aromatic polyester resins, represented by polybutylene terephthalate resins and polyethylene terephthalate resins, are excellent in various properties such as heat resistance, chemical resistance, electrical properties mechanical properties, and moldability. For this reason, thermoplastic aromatic polyester resin compositions are widely used, as engineering plastics, in electric/electronic device components, automotive components, and the like.

However, when exposed to a high-temperature and high-humidity environment for a long time, the properties of thermoplastic aromatic polyester resins sometimes decline due to hydrolysis. For this reason, an improvement in hydrolysis resistance is sought, in particular, in thermoplastic aromatic polyester resin compositions used in molded articles such as automotive components which are used in environments that readily become high-temperature and high-humidity. Techniques of using thermoplastic aromatic polyester resins having few terminal carboxyl groups and of blocking terminal carboxyl groups of thermoplastic aromatic polyester resins by adding an epoxy compound, a carbodiimide compound or the like are used as techniques for improving hydrolysis resistance in thermoplastic aromatic polyester resin compositions (Patent Documents 1 and 2).

Patent Document 1: JP 2004-075756 A
Patent Document 2: WO 2010/018662 A Pamphlet

SUMMARY OF INVENTION

Technical Problem

Here, the present inventors carried out extensive research into a method for improving the hydrolysis resistance of a thermoplastic aromatic polyester resin composition suitable for use in molded articles exposed to a high-temperature and high-humidity environment such as automotive components. Then, the present inventors discovered that when adding a terminal blocking agent such as a carbodiimide compound to a thermoplastic aromatic polyester resin, it is possible to further improve the hydrolysis resistance of the thermoplastic aromatic polyester resin composition by further blending an alkali compound in a state wherein the alkali compound has been included in a thermoplastic aromatic polyester resin the same as or different to the above-mentioned thermoplastic aromatic polyester resin, thereby arriving at the present invention.

The present invention addresses the problem of providing a manufacturing method for a thermoplastic aromatic polyester resin composition which is excellent in hydrolysis resistance.

Solution To Problem

The manufacturing method for a thermoplastic aromatic polyester resin composition according to the present invention has a step of blending: a thermoplastic aromatic polyester resin A; an alkali composition B containing a thermoplastic aromatic polyester resin a and an alkali compound b; and a carbodiimide compound C.

In the present invention, the alkali composition B is preferably obtained h melt-kneading an aqueous solution of the alkali compound b with the thermoplastic aromatic polyester resin a. The carbodiimide compound C preferably contains an aromatic carbodiimide compound. The alkali compound b content in the thermoplastic aromatic polyester resin composition is preferably 10 ppm by mass or more and 100 ppm by mass or less. Further, the alkali compound b content in the alkali composition B may be arranged to be 0.05 mass % or more and 5 mass % or less.

In the present invention, the thermoplastic aromatic polyester resins A and a are preferably polybutylene terephthalate-based resins.

In the present invention, the alkali compound b may be an alkali metal compound or an alkali earth metal compound. Further, the alkali compound b may be an alkali metal salt or an alkali earth metal salt. The alkali compound b is preferably potassium acetate and/or calcium carbonate.

Further, the present invention may be configured so as to obtain a thermoplastic aromatic polyester resin composition in which a tensile break strain in compliance with ISO527-1,2, after treatment for 60 hours under a high-temperature and high-humidity environment at 121° C. and 100% RH, has a retention rate of 50% or more with respect to before the treatment.

Advantageous Effects of Invention

According to the present invention, it is possible to provide a manufacturing method for a thermoplastic aromatic polyester resin composition which is excellent in hydrolysis resistance.

DESCRIPTION OF EMBODIMENTS

One embodiment of the present invention is described in detail below. The present invention is not limited to the following embodiment, and may be implemented by making changes, as appropriate, within a range not hindering the effects of the present invention.

[Manufacturing Method for Thermoplastic Aromatic Polyester Resin Composition]

The manufacturing method for a thermoplastic aromatic polyester resin composition (hereinafter also referred to as the "resin composition") of the present embodiment has a step of blending: a thermoplastic aromatic polyester resin A; an alkali composition B containing a thermoplastic aromatic polyester resin a and an alkali compound b; and a carbodiimide compound C. The resin composition obtained by this manufacturing method is particularly excellent in hydrolysis resistance (high-temperature and high-humidity resistance).

(Thermoplastic Aromatic Polyester Resin A)

The thermoplastic aromatic polyester resin A is a thermoplastic polyester resin obtained by means of a reaction between a dicarboxylic acid component in which the main component is a dicarboxylic acid compound and/or an ester-forming derivative thereof, and a diol component in which the main component is a diol compound and/or an ester-forming derivative thereof, wherein at least one of the dicarboxylic acid component and the diol component includes an aromatic compound.

Dicarboxylic acid components include, for example, aliphatic dicarboxylic acids (for example, approximately $C_{4-40}$ dicarboxylic acids, preferably approximately $C_{4-14}$ dicarboxylic acids, such as succinic acid, glutaric acid, adipic acid, pimelic acid, suberic acid, azelaic acid, sebacic acid, undecanedicarboxylic acid, dodecanedicarboxylic acid, hexadecanedicarboxylic acid, and dimeric acid), alicyclic dicarboxylic acids (for example, approximately $C_{4-40}$ dicarboxylic acids, preferably approximately $C_{8-12}$ dicarboxylic acids, such as hexahydrophthalic acid, hexahydroisophthalic acid, hexahydroterephthalic acid, and himic acid), aromatic dicarboxylic acids (for example, approximately $C_{8-16}$ dicarboxylic acids such as phthalic acid, isophthalic acid, terephthalic acid, methylisophthalic acid, methylterephthalic acid, naphthalene dicarboxylic acids such as 2,6-napthalenedicarboxylic acid, 4,4'-biphenyldicarboxylic acid, 4,4'-diphenoxy ether dicarboxylic acid, 4,4'-dioxybenzoic acid, 4,4'-diphenylmethanedicarboxylic acid, and 4,4'-diphenylketonedicarboxylic acid) or derivatives (for example, lower alkyl esters, aryl esters, and ester-forming derivatives such as acid anhydrides) thereof. These dicarboxylic acid components may be used singly or by combining two or more types. Preferred dicarboxylic acid components include aromatic dicarboxylic acids such as terephthalic acid, isophthalic acid, and naphthalenedicarboxylic acid (particularly terephthalic acid and 2,6-naphthalenedicarboxylic acid). The dicarboxylic acid component contains, for example, 50 mol % or more, preferably 80 mol % or more, and more preferably 90 mol % or more of an aromatic dicarboxylic acid. Furthermore, it is possible to also use, as needed, a polyvalent carboxylic acid such as trimellitic add or pyromellitic acid, or an ester-forming derivative (such as an alcohol ester) thereof. By also including such a polyfunctional compound, it is possible to obtain a branched thermoplastic polyester resin.

Diol components include, for example, aliphatic alkanediols (for example, approximately $C_{2-12}$ aliphatic diols, preferably approximately $C_{2-10}$ aliphatic diols, such as ethylene glycol, trimethylene glycol, propylene glycol, 1,4-butanediol, 1,3-butanediol, neopentyl glycol, hexanediol, octanediol, and decanediol), polyoxyalkylene glycols (glycols having multiple oxyalkylene units that are approximately $C_{2-4}$ alkylene groups such as, for example, diethylene glycol, dipropylene glycol, ditetramethylene glycol, triethylene glycol, tripropylene glycol, and polytetramethylene glycol) alicyclic diols (such as, for example, 1,4-cyclohexanediol, 1,4-cyclohexanedimethanol, and hydrogenated bisphenol A). Additionally, it is possible to also add an aromatic diol such as hydroquinone, resorcinol, bisphenol, 2,2-bis(4-hydroxyphenyl)propane, 2,2-bis(-4-(2-hydroxyethoxy)phenyl)propane, and xylylene glycol. These diol components may be used singly or by combining two or more types. Preferred diol components include $C_{2-10}$ alkylene glycols (linear alkylene glycols such as ethylene glycol, trimethylene glycol, propylene glycol, and 1,4-butanediol) and the like. The diol component contains, for example 50 mol % or more, preferably 80 mol % or more, and more preferably 90 mol % or more of a $C_{2-10}$ alkylene glycol. Furthermore, it is possible to also use, as needed, a polyol such as glycerin trimethylolpropane, trimethylolethane, and pentaerythritol, or an ester-forming derivative thereof. By also including such a polyfunctional compound, it is possible to obtain a branched thermoplastic polyester resin.

As the thermoplastic aromatic polyester resin A, it is possible to use a copolyester combining two or more of the above-mentioned dicarboxylic acid components and diol components, or a copolyester further combining as another monomer that is copolymerizable (hereinafter sometimes referred to as a copolymerizable monomer), an oxycarboxylic acid component, a lactone component or the like.

Oxycarboxylic adds (or oxycarboxylic acid components or oxycarboxylic acid-related compounds) include, for example, oxybenzoic acid, oxynaphthoic acid, hydroxyphenylacetic acid, glycolic acid, and oxycaproic acid, or derivatives thereof. Lactones include $C_{3-12}$ lactones such as propiolactone, butyrolactone, valerolactone and caprolactone (for example, ε-caprolactone or the like).

In the copolyester, the proportion of copolymerizable monomers may be selected, for example, from within the range of approximately 0,01 mol % or more and 30 mol % or less, normally approximately 1 mol % or more and 30 mol % or less preferably approximately 3 mol % or more and 25 mol % or less, and more preferably approximately 5 mol % or more and 20 mol % or less. Additionally, when using a combination of a homopolyester and a copolyester, the proportions of the homopolyester and the copolyester should be within a range such that the proportion of the copolymerizable monomers relative to all of the monomers is 0.1 mol % or more and 30 mol % or less (preferably approximately 1 mol % or more and 25 mol % or less, and more preferably approximately 5 mol % or more and 25 mol % or less), and normally, homopolyesterlcopolyester=99/1 to 1/99 (mass ratio), and may preferably be selected from within the range of 95/5 to 5/95 (mass ratio), and more preferably approximately 90/10 to 10/90 (mass ratio).

Preferred thermoplastic aromatic polyester resins A include homopolyesters or copolyesters in which the main component (for example, 50-100 mol %, and preferably approximately 75-100 mol %) is an alkylene arylate unit such as alkylene terephthalate or alkylene naphthalate [for example, homopolyesters of polyalkylene terephthalates (for example, poly $C_{2-4}$ alkylene terephthalates such as polyethylene terephthalate (PET), polytrimethylene terephthalate (PIT), and polybutylene terephthalate (PBT)), of 1,4-cyclohexanedimethylene terephthalate (PCT) and of polyalkylene naphthalates (for example, poly $C_{2-4}$ alkylene naphthalates such as polyethylene naphthalate, polypropylene naphthalate, and polybutylene naphthalate); and copolyesters containing, as main components (for example, 50 mol % or more), alkylene terephthalate and/or alkylene naphthalate units], and these may be used as one type singly or by combining two or more types.

Particularly preferred thermoplastic aromatic polyester resins A include homopolyester resins or copolyester resins (such as, for example, polyethylene terephthalate resin, polytrimethylene terephthalate resin, polybutylene terephthalate resin, and polytetramethylene-2,6-naphthalenedicarboxylate resin) containing 80 mol % or more (particularly 90 mol % or more) of $C_{2-4}$ alkylene arylate units such as ethylene terephthalate, trimethylene terephthalate, tetramethylene terephthalate, and tetramethylene-2,6-naphthalate, Among the above, polyethylene terephthalate resin and polybutylene terephthalate resin are preferred, and polybutylene terephthalate resin is particularly preferred.

The terminal carboxyl group content in the thermoplastic aromatic polyester resin A is not particularly limited as long as the effects of the present invention are not hindered. The terminal carboxyl group content in the thermoplastic aromatic polyester resin A is preferably 30 meq/kg or less, and more preferably 25 meq/kg or less.

The intrinsic viscosity (IV) of the thermoplastic aromatic polyester resin A is not particularly limited within a range not hindering the effects of the present invention. The intrinsic viscosity of the thermoplastic aromatic polyester resin A is preferably 0.60 to 1.30 dL/g. For the purpose of improving moldability and heating/cooling durability, the intrinsic viscosity of the thermoplastic aromatic polyester resin A is more preferably 0.65 to 120 dL/g. When a thermoplastic aromatic polyester resin A having an intrinsic viscosity in these ranges is used, the alkali composition B can be blended more uniformly. Additionally, it is possible to adjust the intrinsic viscosity by blending a thermoplastic aromatic polyester resin A having a different intrinsic viscosity. For example, by blending a thermoplastic aromatic polyester resin A having an intrinsic viscosity of 1.0 dL/g with a thermoplastic aromatic polyester resin A having an intrinsic viscosity of 0.8 dL/g, it is possible to prepare a thermoplastic aromatic polyester resin A having an intrinsic viscosity of 0.9 dL/g. The intrinsic viscosity (IV) of the thermoplastic aromatic polyester resin A can, for example, be measured under conditions in which the temperature is 35° C. in o-chlorophenol.

As the thermoplastic aromatic polyester resin A, it is possible to use a commercially available product, or to use one produced by copolymerizing (by polycondensation), by means of a conventionally used method such as ester exchange or direct esterification, the dicarboxylic acid component or a reactive derivative thereof, the diol component or a reactive derivative thereof, and, if needed, a copolymerizable monomer. However, when an alkali compound is added during polymerization of the thermoplastic aromatic polyester resin A, the reaction may be inhibited and productivity may decrease. Therefore, the thermoplastic aromatic polyester resin A in the present embodiment is preferably obtained without an alkali compound being added during polymerization.

(Alkali Composition B)

The alkali composition B contains a thermoplastic aromatic polyester resin a and an alkali compound b. Due to the alkali composition B containing a thermoplastic aromatic polyester resin a and an alkali compound b, it is possible to improve the hydrolysis resistance of the resin composition. The alkali composition B preferably contains a melt-kneaded product of the thermoplastic aromatic polyester resin a and an aqueous solution of the alkali compound b. By using a melt-kneaded product of the thermoplastic aromatic polyester resin a and an aqueous solution of an alkali compound, superior hydrolysis resistance can be exhibited even during long exposures to a high-temperature and high-humidity environment. A "melt-kneaded product" refers to a product obtained by kneading the thermoplastic aromatic polyester resin a and an aqueous solution of the alkali compound b at a temperature capable of melting the thermoplastic aromatic polyester resin a.

The types of resins that can be used as the thermoplastic aromatic polyester resin a and the method for producing the resin are the same as those for the thermoplastic aromatic polyester resin A described above, so the description thereof will be omitted. The thermoplastic aromatic polyester resin a may be a resin, among the abovementioned resins, that is the same type of resin as the thermoplastic aromatic polyester resin A, or may be a different type of resin, but it should preferably contain a resin that is of the same type as the thermoplastic aromatic polyester resin A, in an amount that is 50 mass % or more and 100 mass % or less of the entire resin component. In particular, it is preferable for the thermoplastic aromatic polyester resin a to be a polybutylene terephthalate-based resin, and more preferable for both of the thermoplastic aromatic polyester resins A and a to be a polybutylene terephthalate-based resin.

The thermoplastic aromatic polyester resin a content is preferably 95 mass % or more and 99.95 mass % or less of the entire alkali composition B.

The intrinsic viscosity (IV) of the thermoplastic aromatic polyester resin a is not particularly limited within a range not hindering the effects of the present invention, but is preferably 0.60 to 1.30 dL/g, and more preferably 0.65 to 120 dL/g in order to make it easier to uniformly knead the alkali compound b and to make it easier to uniformly blend the alkali composition B into the thermoplastic aromatic polyester resin A. The intrinsic viscosity (IV) of the thermoplastic aromatic polyester resin may be measured by the same method mentioned above.

Examples of the alkali compound b include alkali metal compounds and alkali earth metal compounds, and also include alkali metal salts and alkali earth metal salts. Examples of the alkali compound b include potassium chloride, potassium alum, potassium formate, tripotassium citrate, dipotassium hydrogen citrate, potassium dihydrogen citrate, potassium gluconate, potassium succinate, potassium butyrate, dipotassium oxalate, potassium hydrogen oxalate, potassium stearate, potassium phthalate, potassium hydrogen phthalate, potassium metaphosphate, potassium malate, tripotassium. phosphate, dipotassium hydrogen phosphate, potassium dihydrogen phosphate, potassium nitrite, potassium benzoate, potassium hydrogen tartrate, oxalic acid monopotassium salt, phthalic acid monopotassium salt, tartaric acid monopotassium salt, sulfuric acid monopotassium salt, potassium nitrate, potassium acetate, potassium hydroxide, potassium carbonate, potassium sodium carbonate, potassium hydrogen carbonate, potassium lactate, potassium sulfate, potassium hydrogen sulfate, sodium chloride sodium formate, trisodium citrate, disodium hydrogen citrate, sodium dihydrogen citrate, sodium gluconate, sodium succinate, sodium butyrate, disodium oxalate, sodium hydrogen oxalate sodium stearate, sodium phthalate, sodium hydrogen phthalate, sodium metaphosphate, sodium malate, trisodium phosphate, disodium hydrogen phosphate, sodium dihydrogen phosphate, sodium nitrite, sodium benzoate, sodium hydrogen tartrate, oxalic acid monosodium salt, phthalic acid monosodium salt, tartaric acid monosodium salt, sulfuric acid monosodium salt, sodium nitrate, sodium acetate, sodium hydroxide, sodium carbonate, sodium hydrogen carbonate, sodium lactate, sodium sulfate, sodium hydrogen sulfate, lithium chloride, lithium formate, trilithium citrate, dilithium hydrogen citrate, lithium dihydrogen citrate, lithium gluconate, lithium succinate, lithium butyrate, dilithium oxalate, lithium hydrogen oxalate, lithium stearate, lithium phthalate, lithium hydrogen phthalate, lithium metaphosphate, lithium malate, trilithium phosphate, dilithium hydrogen phosphate, lithium dihydrogen phosphate, lithium nitrite, lithium benzoate, lithium hydrogen tartrate, oxalic acid monolithium salt, phthalic acid monolithium salt, tartaric add monolithium salt, sulfuric acid monolithium salt, lithium nitrate, lithium acetate, lithium hydroxide, lithium carbonate, lithium hydrogen carbonate, lithium lactate, lithium sulfate, lithium hydrogen sulfate, calcium chloride, calcium formate, calcium citrate, calcium gluconate, calcium succinate, calcium butyrate, calcium oxalate, calcium stearate, calcium phthalate, calcium metaphosphate calcium malate, calcium phosphate, calcium hydrogen phosphate, calcium dihydrogen phosphate, calcium nitrite, calcium benzoate, calcium tartrate, oxalic acid monocalcium salt, phthalic acid monocalcium salt, tartaric add monocalcium salt, sulfuric acid monocalcium salt, calcium nitrate, calcium acetate, calcium hydroxide, calcium carbonate, calcium lactate, and calcium sulfate, etc. Among these alkali compounds, a compound selected from potassium acetate and calcium carbonate is preferable, and potassium acetate is particularly preferable. These alkali compounds b may be used singly or by combining two or more types, The alkali compound b content in the entire thermoplastic aromatic polyester resin composition is preferably 10 ppm by mass or more and 100 ppm by mass or less, more preferably 15 ppm by mass or more and 50 ppm by mass or less, and even more preferably 20 ppm by mass or more and 40 ppm by mass or less. By setting the content of the alkali compound b to be 10 ppm by mass or more and 100 ppm by mass or less with respect to the entire resin composition, it is possible to obtain a thermoplastic aromatic polyester resin composition which is particularly excellent in hydrolysis resistance.

The alkali compound b content in the alkali composition B is not particularly limited, but is preferably 0.05 mass % or more and 5 mass % or less 0.08 mass % or more and 1 mass % or less, or 0.1 mass % or more and 0.5 mass % or less, in the alkali composition B. When the alkali compound b content in the alkali composition B is 0.05 mass % or more, it is not necessary to greatly increase the content of the alkali composition B to be blended in the thermoplastic aromatic polyester resin composition A and therefore it is easy to manage raw materials and steps at the manufacturing site. When the alkali compound b content in the alkali composition B is 5 mass % or less, it is easy to uniformly disperse the alkali compound b in the thermoplastic aromatic polyester resin composition.

The dispersion state of the compound b in the alkali composition B is not particularly limited within a range not hindering the effects of the present invention. For example, when producing the alkali composition B by, melt-kneading the thermoplastic aromatic polyester resin a and the alkali compound b, it is possible to use an alkali composition B that, having had aggregates removed therefrom by using a filter, has better dispersibility. Additionally, since reducing the filter pore size or increasing the number of filters sometimes leads to reduced productivity, the dispersion state may be adjusted, as appropriate, by considering the productivity.

It is also possible to blend another resin, for example, a thermosetting resin or a thermoplastic resin such as a styrene-based resin or an acrylic-based resin, as needed, into the alkali composition B. In this case, the content of the other resin may be more than 0 mass % and 20 mass % or less in the alkali composition B. Further, various additives, for example, stabilizers (such as antioxidants, UV absorption agents and thermal stabilizers), flame retardants, lubricants, mold release agents, antistatic, agents dispersants, plasticizing agents, and nucleating agents may be blended into the alkali composition B. In this case, the content of the additives may, for example, be more than 0 mass % and 20 mass % or less of the entire alkali composition B.

The method for producing the alkali composition B may involve producing by using a normal method to knead together the thermoplastic aromatic polyester resin a and the alkali compound b. For example, the alkali composition B may be produced by loading the thermoplastic aromatic polyester resin a, the alkali compound b, and other additives into a mixer and mixing until uniform, then melting and kneading in an extruder. At that time, by dissolving the alkali compound b in water and supplying in a state of an aqueous solution, it is possible to improve dispersibility in the alkali composition B. Further, when the alkali compound b is added as a solid, the alkali compound b may act as a nucleating agent and thereby have an effect on toughness, etc., but if the alkali compound b is added as an aqueous solution, it is possible to suppress the alkali compound h acting as a nucleating agent. Here, the alkali compound b concentration in the aqueous solution is preferably 1 mol/L or more and 100 mol/L or less, and more preferably 2 mol/L or more and 50 mol/L or less. This is because: when the alkali compound b concentration is 1 mol/L or more, the water content is not excessive and it is possible to keep the thermoplastic aromatic polyester resin a from being hydrolyzed when producing the alkali composition B; and meanwhile, when the alkali concentration is 100 mol/L or less, it is easy to uniformly disperse the alkali compound b in the alkali composition B. Further, the obtained alkali composition B may be put into various forms such as a powder, pellets, or strips.

(Carbodiimide Compound C)

The carbodiimide compound C is a compound having in a molecule thereof a carbodiimide group (—N=C=N—). Examples of the carbodiimide compound C include aliphatic carbodiimide compounds in which the main chain is aliphatic, alicyclic carbodiimide compounds in which the main chain is alicyclic, and aromatic carbodiimide compounds in which the main chain is aromatic. Any of the foregoing may be used, but among these, aromatic carbodiimide compounds are preferable for having superior heat resistance and hydrolysis resistance.

Specifically, examples of the aliphatic carbodiimide compounds include diisopropylcarbodiimiide and dioctyldecylcarbodiimide, etc. Further, examples of the alicyclic carbodiimide compounds include dicyclohexylcarbodiimide etc. Other than these monofunctional aliphatic carbodiimide compounds and alicyclic carbodiimides, it is also possible to use a multifunctional carbodiimide which can be synthesized by causing one or two or more selected from hexamethylene diisocyanate, cyclohexane-1,4-diisocyanate, isophorone diisocyanate, 4/4'-dicyclohexylmethane diisocyanate, methylcyclohexane diisocyanate, 1,3-bis(isocyanatomethyl)cyclohexane xylylene diisocyanate, and tetramethylxylylene diisocyanate to undergo a decarboxylation condensation reaction.

Further, examples of the aromatic carbodiimide compound include: mono or dicarbodiimide compounds such as diphenyl carbodiimide, di-2,6-dimethylphenyl carbodiimide, N-tolyl-N'-phenyl carbodiimide, di-p-nitrophenyl carbodiimide, di-p-aminophenyl carbodiimide, di-p-hydroxyphenyl carbodiimide, di-p-chlorophenyl carbodiimide, di-p-methoxyphenyl carbodiimide, di-3,4-dichlorophenyl carbodiimide, di-2,5-dichlorophenyl carbodiimide, di-o-chlorophenyl carbodiimide, p-phenylene-bis-di-o-triyl carbodiimide, p-phenylene-bis-dicyclohexyl carbodiimide, p-phenylene-bis-di-p-chlorophenyl dicarbodiimide, and ethylene-bis-diphenyl carbodiimide; and polycarbodiimide compounds such as poly(4,4'-diphenylmethane carbodiimide), poly(3,5'-dimethyl-4,4'-biphenylmethane carbodiimide), poly(p-phenylene carbodiimide), poly(m-phenylene carbodiimide), poly (3,5'-dimethyl-4,4'-diphenylmethane carbodiimide), poly(naphthylene carbodiimide), poly (1,3-diisopropylpheylene carbodiimide), poly(1-methyl-3,5-diisopropylphenylene carbodiimide), poly(1,3,5-triethylphenylene carbodiimide), and poly(triisopropylphenylene carbodiimide). Among these, di-2,6-dimethylphenyl carbodiimide, poly(4,4'-diphenylmethane carbodiimide), poly (phenylene carbodiimide) and poly(triisopropylphenylene carbodiimide) are particularly preferably used. These may be used singly or by combining two or more types.

Further, there are no particular limitations regarding the carbodiimide compound C, but using a compound having a molecular weight of 2,000 or more is preferred. If the molecular weight is less than 2,000, there is a concern of a gas or odor being produced when residence time during melt-kneading or molding is long.

The blended amount of the carbodiimide compound C with respect to the entire thermoplastic aromatic polyester resin composition is preferably 0.01 mass % or more and 3.0 mass % or less, more preferably 0.05 mass % or more and 2.0 mass % or less, and even more preferably 0.1 mass % or more and 1.0 mass % or less.

By setting the blended amount of the carbodiimide compound C to be 0.01 mass % or more, it is possible to obtain a resin compound having superior hydrolysis resistance. By setting the blended amount of the carbodiimide compound C to be 3.0 mass % or less, it is possible to prevent a decrease in flowability and also prevent a gel component or carbide being formed during compounding (during production of the resin composition) and during the molding process. As a result thereof, it is possible to suppress a decrease in mechanical properties such as tensile strength and tensile break strain. Further, generally, when a carbodiimide compound is blended into a thermoplastic aromatic polyester resin composition, a gas or odor is sometimes produced during melt-kneading or molding. However, when the blended amount is 0.01 mass % or more and 3.0 mass % or less, it is possible both to obtain superior hydrolysis resistance and to suppress production of an isocyanate gas derived from the carbodiimide compound, and thus a deterioration of a working environment can be suppressed while also achieving superior hydrolysis resistance.

(Other Blended Agents)

In the manufacturing method for a thermoplastic aromatic polyester resin composition according to the present embodiment, it is possible to blend various additives into the thermoplastic aromatic polyester resin composition. For example, it is possible to blend in a heat shock resistance improving agent such as an elastomer for the purpose of enhancing heat shock resistance.

Examples of the elastomer include olefin-based elastomers, vinyl chloride-based elastomers, styrene-based elastomers, polyester-based elastomers, butadiene-based elastomers, urethane-based elastomers, polyamide-based elastomers, silicone-based elastomers, and core-shell elastomers. Specifically, it is possible to use ethylene ethyl acrylate (EEA)-based copolymers, methacrylic acid ester-butylene-styrene (MBS)-based copolymers, ethylene glycidyl methacrylate (EGMA)-based copolymers, polytetramethylene glycol (PTMG)-based polyester elastomers, and the like. An example of an ethylene ethyl acrylate (EEA)-based copolymer is a graft copolymer of ethylene ethyl acrylate with butyl acrylate and/or methyl methacrylate.

The blended amount of the elastomer is preferably 1 mass % or more and 30 mass % or less, and more preferably 5 mass % or more and 20 mass % or less in the thermoplastic aromatic polyester resin composition. By blending 1 mass % or more and 30 mass % or less of the elastomer into the thermoplastic aromatic polyester resin composition, it is possible to obtain a resin composition with excellent heat shock resistance without compromising the mechanical properties of the thermoplastic aromatic polyester resin composition.

Additionally, an inorganic filler may be blended in for the purpose of improving the mechanical properties of the obtained molded article. Examples of inorganic fillers include fibrous fillers, flake-shaped fillers, and granular fillers. Fibrous fillers include, for example, inorganic fibers such as glass fiber, asbestos fiber, carbon fiber, silica fiber, alumina fiber, silica-alumina fiber, aluminum silicate fiber, zirconia fiber, potassium titanate fiber, silicon carbide fiber, and whiskers (whiskers of silicon carbide, alumina, silicon nitride or the like); and organic fibers such as fibers formed from aliphatic or aromatic polyamides, aromatic polyesters, fluororesins, acrylic resins such as polyacrylonitrile, and rayon and the like. Flake-shaped fillers include, for example, talc, mica, glass flakes, graphite and the like. Granular fillers include, for example, glass beads, glass powders, milled fiber (such as, for example, milled glass fiber), wollastonite (tabular spar) and the like. Wollastonite may be in the form of flakes, columns, fibers or the like. Among these inorganic fillers, glass fiber is preferred for being inexpensive and easily available.

The average diameter of the fibrous filler may, for example, be approximately 1 μm to 30 μm (preferably 5 μm to 20 μm, and more preferably 10 to 15 μm), and the average length may, for example, be approximately 100 μm to 5 mm (preferably 300 μm to 4 mm, and more preferably 500 μm to 3.5 mm). Additionally, the average primary particle diameter of the flake-shaped or granular filler may, for example, be 0.1 μm to 500 μm, and preferably approximately 1 μm to 100 μm. These inorganic fillers may be used singly or by combining two or more types. The average particle diameter and average length of the fibrous filler, and the average primary particle diameter of the flake-shaped or granular filler, are values that are calculated by analyzing images of the fibrous filler or the flake-shaped or granular filler, captured by a CCD camera, before being blended into the resin composition, and taking a weighted average thereof. These may, for example, be computed by using a dynamic image analysis/particle (state) analyzer PITA-3, manufactured by Seishin Enterprise. The aspect ratio of the flake-shaped or granular filler is not particularly limited and may, for example, be 1 or more and 10 or less.

The content ratio of the inorganic filler in the entire thermoplastic aromatic polyester resin composition is preferably 10 mass % or more and 50 mass % or less more preferably 15 mass % or more and 40 mass % or less and even more preferably 20 mass % or more and 35 mass % or less.

Further, it is possible to acid stabilizers (such as antioxidants, UV absorption agents, and thermal stabilizers), flame retardants, lubricants, mold release agents, antistatic agents, dispersants, plasticizing agents, nucleating agents, flowability improving agents or the like to the thermoplastic aromatic polyester resin composition. In this case, the additive content may, for example, be more than 0 mass % and 20 mass % or less of the entire thermoplastic aromatic polyester resin composition.

Additionally, it is possible to add an epoxy compound such as a bisphenol A epoxy compound or a novolac epoxy compound to the thermoplastic aromatic polyester resin composition in order to further improve hydrolysis resistance, heat shock resistance or the like. Additionally, if necessary, the thermoplastic aromatic polyester resin composition may be used in combination with another resin (for example, a thermosetting resin or a thermoplastic resin such as a styrene-based resin or an acrylic-based resin).

(Blending)

The method for blending the thermoplastic aromatic polyester resin A, the alkali composition B, and the carbodiimide compound C is not particularly limited. For example, the thermoplastic aromatic polyester resin A, the alkali composition B, the carbodiimide compound C, and other blended agents, as needed, are loaded, in various forms such as powders, pellets, or strips, into a melt-kneader after pre-mixing as needed. Next, the mixture is heated to at least the melting points of the thermoplastic aromatic polyester resins A and a, then melt-kneaded to obtain a resin composition in which the thermoplastic aromatic polyester resin A, the alkali composition B, and the carbodiimide compound C are blended.

The blended amount of the thermoplastic aromatic polyester resin A may, for example, be 40 mass % or more and 99 mass % or less, and preferably 50 mass % or more and 90 mass % or less, of the entire resin composition. When the blended amount of the thermoplastic aromatic polyester resin A is within this range, the properties of the thermoplastic aromatic polyester resin A are sufficiently exhibited, and it is possible to obtain a resin composition having excellent performance in various properties such as heat resistance, chemical resistance, electrical properties such as tracking resistance, mechanical properties, and moldability.

The blended amount of the alkali composition B (thermoplastic aromatic polyester resin a and alkali compound b) is preferably selected so that the hydrolysis resistance of the molded article is sufficiently improved. For example, when the alkali compound b content in the alkali composition B is 0.05 mass % or more and 5 mass % or less, and when the alkali compound b content in the entire thermoplastic aromatic polyester resin composition is, as described above, 10 ppm by mass or more and 100 ppm by mass or less (0.001 mass % or more and 0.01 mass % or less) and preferably 15 ppm by mass or more and 50 ppm by mass or less (0.0015 mass % or more and 0.005 mass % or less), the blended amount of the alkali composition B is preferably 0.02 mass % or more and 20 mass % or less, and more preferably 0.03 mass % or more and 10 mass % or less, in the entire resin composition. The biended amount of the carbodiimide compound C is as described above.

[Thermoplastic Aromatic Polyester Resin Composition]

Due to the abovementioned production method, it is possible to suppress a decrease in hydrolysis resistance in a thermoplastic aromatic polyester resin composition. As a result thereof, it is possible to obtain a thermoplastic aromatic polyester resin composition which is particularly excellent in hydrolysis resistance. This thermoplastic aromatic polyester resin composition may be a granular mixture or a melted mixture (pellets or the like).

This thermoplastic aromatic polyester resin composition is able to provide sufficient hydrolysis resistance. For example, in a high-temperature, high-humidity treatment involving a 60-hour treatment at 121° C. and 100% RH, it is possible to render the retention rate of the tensile break strain after treatment with respect to the tensile break strain before the treatment to be 50% or more or 70% or more, and also to be 80% or more or 90% or more. The retention rate is a value obtained by (tensile break strain after high-temperature, high-humidity treatment)×(tensile break strain before high-temperature, high-humidity treatment)×100(%). That is, the value of [(tensile break strain after high-temperature, high-humidity treatment)/(tensile break strain before high-temperature, high-humidity treatment)×100(%)] can be rendered to be 50% or more or 70% or more, and also to be 80% or more or 90% or more. Further, in a high-temperature, high-humidity treatment involving a 72-hour treatment at 121° C. and 100% RH, it is possible to render the retention rate of the tensile break strain to be 50% or more and also to be 80% or more or 90% or more.

For this reason, this thermoplastic aromatic polyester resin composition is suitable for use as a resin composition for a molded article for use in automotive components, etc, that is exposed to a high-temperature and high-humidity environment for a long time. A molded article comprising this resin composition can sufficiently prevent the occurrence of degradation due to hydrolysis even when used in a high-temperature and high-humidity environment for a long time.

EXAMPLES

While the present invention will be explained more specifically by providing examples below, the interpretation of the present invention is not limited by these examples.

[Materials]

The materials used in the examples and comparative examples are shown below.

Thermoplastic aromatic polyester resin: polybutylene terephthalate resin (PBT) with intrinsic viscosity of 0.84 dL/g, manufactured by WinTech Polymer Alkali composition: polybutylene terephthalate resin (polybutylene terephthalate resin with intrinsic viscosity of 0.68 dL/g, manufactured by WinTech Polymer, 99.9 mass %) and potassium acetate (potassium acetate, manufactured by Wako Pure Chemical Corporation, 0.1 mass %)

Alkali compound: potassium acetate (potassium acetate, manufactured by Wako Pure Chemical Corporation)

Carbodiimide compound: aromatic polycarbodiimide (Stabaxol P400, manufactured by Rhein Chemie Japan, molecular weight approximately 20,000)

Mold release agent: Rikemal B-74, manufactured by Riken Vitamin Co., Ltd.

Antioxidant: Irganox 1010, manufactured by BASF Japan, Co., Ltd.

Stabilizer: ADK STAB PEP-36, manufactured by ADEKA CORPORATION

Reference Example 1

Production of Alkali Composition 1

Using as base ingredient a mixture obtained by mixing the abovementioned polybutylene terephthalate resin (thermoplastic aromatic polyester resin) for an alkali composition and a 50 mass % concentration (approximately 10 mol/L) potassium acetate aqueous solution (alkali compound aqueous solution) so that the mass ratio of the polybutylene terephthalate resin to the potassium acetate is 99.9:0.1, this base ingredient was loaded into a single-screw extruder (HS65, manufactured by Ishinaka Iron Works, Co., Ltd.) and melt-kneaded at a cylinder temperature of 250° C. to produce an alkali composition.

Reference Example 2

Production of Alkali Composition 2

Using as a base ingredient a mixture obtained by mixing the abovementioned polybutylene terephthalate resin (thermoplastic aromatic polyester resin) and potassium acetate (alkali compound) so that the mass ratio of the polybutylene terephthalate resin to tire potassium acetate is 99.9:0.1, this base ingredient was loaded into a single-screw extruder (HS65, manufactured by Ishinaka Iron Works, Co., Ltd.) and melt-kneaded at a cylinder temperature of 250° C. to produce an alkali composition.

Example 1

Using the alkali composition 1 obtained in Reference Example 1 as the alkali composition, the materials shown in Table 1 were melt-kneaded in the proportional contents shown in Table 1 using a twin-screw extruder (manufactured by The Japan Steel Works, Ltd., cylinder diameter 30 mmϕ) at a cylinder temperature of 250° C. to produce the thermoplastic aromatic polyester resin composition pellets of Example 1.

Example 2

The thermoplastic aromatic polyester resin composition pellets of Example 2 were produced in the same manner as Example 1 with the exception that alkali composition 2 obtained in Reference Example 2 was used as the alkali composition in the proportional content shown in Table 1.

Comparative Example 1

The thermoplastic aromatic polyester resin con position pellets of Comparative Example 1 were produced in the same manner as Example 1 with the exception that instead of the alkali composition, an alkali compound was used in the proportional content shown in Table 1.

Evaluation
(Hydrolysis Resistance)

The thermoplastic aromatic polyester resin composition pellets obtained in the Examples and Comparative Examples were dried for three hours at 140° C., then injection molded under conditions of a cylinder temperature of 260° C. and a mold temperature of 80° C. to produce ISO 3167 Type 1A tensile test pieces, and tensile break strain was measured in compliance with ISO 527-1, 2. Further, using a pressure cooker test (PCT) device, the same test pieces were subjected to a high-temperature high-humidity treatment at 121° C. and 100% RH for 24 hours, 48, hours, 60 hours, 72 hours, or 96 hours, then tensile break strain was measured using the same measurement method described above, and the retention rate with respect to before the treatment (tensile break strain after treatment—tensile break strain before treatment×100(%)) was determined. The results are shown in Table 1. When the retention rate at a treatment time of 60 hours is 50% or more, the hydrolysis resistance is excellent, and when the same is 80% or more, the hydrolysis resistance is particularly excellent.

TABLE 1

|  |  | Example 1 | Comparative Example 1 |
|---|---|---|---|
| Thermoplastic aromatic polyester resin | mass % | 96.25 | 99.247 |
| Alkali composition 1 (potassium acetate 0.1% master batch, potassium acetate added as aqueous solution) | mass % | 3.00 | — |
| Alkali compound | mass % | — | 0.003 |
| Carbodiimide compound | mass % | 0.30 | 0.30 |
| Mold release agent | mass % | 0.20 | 0.20 |
| Antioxidant | mass % | 0.10 | 0.10 |
| Stabilizer | mass % | 0.15 | 0.15 |
| Alkali compound content in entire composition | ppm | 30 | 30 |
| Tensile break strain (%) for each high-temperature, high-humidity treatment time (retention rate (%) of tensile break strain) | 0 hours (before treatment) | 11.2 (—) | 11.2 (—) |
|  | 24 hours | 11.4 (102) | 11.3 (101) |
|  | 48 hours | 11.4 (102) | 11.3 (101) |
|  | 60 hours | 11.3 (101) | 5.5 (49) |
|  | 72 hours | 11.3 (101) | — |
|  | 96 hours | 6.8 (61) | — |

TABLE 2

|  |  | Example 2 |
|---|---|---|
| Thermoplastic aromatic polyester resin | mass % | 96.25 |
| Alkali composition 2 (potassium acetate 0.1% master batch, potassium acetate added without formation as aqueous solution) | mass % | 3.00 |
| Alkali compound | mass % | — |
| Carbodiimide compound | mass % | 0.30 |
| Mold release agent | mass % | 0.20 |
| Antioxidant | mass % | 0.10 |
| Stabilizer | mass % | 0.15 |
| Alkali compound content in entire composition | ppm | 30 |
| Tensile break strain (%) for each high-temperature, high-humidity treatment time (retention rate (%) of tensile break strain) | 0 hours (before treatment) | 11.2 (—) |
|  | 24 hours | 11.4 (102) |
|  | 48 hours | 11.3 (101) |
|  | 60 hours | 8.4 (75) |
|  | 72 hours | 5.7 (51) |
|  | 96 hours | — |

As is clear from Table 1, in a molded article comprising resin composition of the Examples, a decrease in hydrolysis resistance is suppressed more than in a molded article comprising the resin composition of the Comparative Example, and by using this manufacturing method, it is possible to improve the hydrolysis resistance of a resin composition. For this reason, even when this molded article is used in a high-temperature and high-humidity environment long time, it is possible to suppress degradation due to hydrolysis.

The invention claimed is:

1. A manufacturing method for a thermoplastic aromatic polyester resin composition, having a step of blending: a thermoplastic aromatic polyester resin A; an alkali composition B containing a thermoplastic aromatic polyester resin a and an alkali compound b; and a carbodiimide compound C,
   wherein the blended amount of the alkali composition B is 0.02 mass % or more and 10 mass % or less in the entire resin composition,
   wherein the thermoplastic aromatic polyester resin A is a thermoplastic aromatic polyester resin A obtained without adding an alkali compound during polymerization.

2. The manufacturing method for a thermoplastic aromatic polyester resin composition according to claim 1, further comprising forming the alkali composition B in a step of melt-kneading an aqueous solution of the alkali compound b with the thermoplastic aromatic polyester resin a.

3. The manufacturing method for a thermoplastic aromatic polyester resin composition according to claim 1, wherein the carbodiimide compound C contains an aromatic carbodiimide compound.

4. The manufacturing method for a thermoplastic aromatic polyester resin composition according to claim 1, wherein the alkali compound b content in the thermoplastic aromatic polyester resin composition is 10 ppm by mass or more and 100 ppm by mass or less.

5. The manufacturing method for a thermoplastic aromatic polyester resin composition according to claim 1, wherein the alkali compound b content in the alkali composition B is 0.05 mass % or more and 5 mass % or less.

6. The manufacturing method for a thermoplastic aromatic polyester resin composition according to claim 1, wherein the thermoplastic aromatic polyester resins A and a are polybutylene terephthalate-based resins.

7. The manufacturing method for a thermoplastic aromatic polyester resin composition according to claim 1, wherein the alkali compound b is an alkali metal compound or an alkali earth metal compound.

8. The manufacturing method for a thermoplastic aromatic polyester resin composition according to claim 1, wherein the alkali compound b is an alkali metal salt or an alkali earth metal salt.

9. The manufacturing method for a thermoplastic aromatic polyester resin composition according to claim 1, wherein the alkali compound b is potassium acetate and/or calcium carbonate.

10. The manufacturing method for a thermoplastic aromatic polyester resin composition according to claim 1, wherein a thermoplastic aromatic polyester resin composition in which a tensile break strain in compliance with ISO 527-1,2, after treatment for 60 hours under a high-temperature and high-humidity environment at 121° C. and 100% RH has a retention rate of 50% or more with respect to before the treatment is obtained.

* * * * *